United States Patent
McCrea

(10) Patent No.: US 7,363,760 B1
(45) Date of Patent: Apr. 29, 2008

(54) THERMODYNAMIC FREE WALKING BEAM ENGINE

(76) Inventor: Craig R McCrea, 560A NE., 'F' St., #157, Grants Path, OR (US) 97526

( * ) Notice: Subject to any disclaimer, the term of this patent is extended or adjusted under 35 U.S.C. 154(b) by 222 days.

(21) Appl. No.: 11/373,454

(22) Filed: Mar. 10, 2006

Related U.S. Application Data

(63) Continuation-in-part of application No. 10/677,517, filed on Oct. 2, 2003, now abandoned.

(51) Int. Cl.
*F01B 29/10* (2006.01)

(52) U.S. Cl. .......................................... 60/517; 60/675

(58) Field of Classification Search .......... 60/517–526, 60/675
See application file for complete search history.

(56) References Cited

U.S. PATENT DOCUMENTS

| | | | |
|---|---|---|---|
| 3,338,798 A | 8/1967 | Parr | |
| 3,400,281 A | 9/1968 | Malik | |
| 3,525,215 A | 8/1970 | Conrad | |
| 3,655,301 A | 4/1972 | McClung | |
| 3,864,932 A | 2/1975 | Hsiao | |
| 3,996,745 A | 12/1976 | Davoud et al. | |
| 4,058,382 A | 11/1977 | Mulder | |
| 4,145,890 A * | 3/1979 | Cruz ............................ | 60/675 |
| 4,195,486 A * | 4/1980 | Rivera-Cruz ................... | 60/675 |
| 4,202,178 A * | 5/1980 | Peterman et al. ............... | 60/675 |
| 4,253,303 A | 3/1981 | Liljequist | |
| 4,311,015 A * | 1/1982 | Rust ............................. | 60/675 |
| 4,397,155 A | 8/1983 | Davey | |
| 4,408,456 A | 10/1983 | Rauch | |
| 4,513,576 A | 4/1985 | Dibrell et al. | |
| 4,642,988 A | 2/1987 | Benson | |
| 4,745,749 A | 5/1988 | Benson | |
| 6,195,992 B1 | 3/2001 | Nommensen | |
| 6,644,026 B2 * | 11/2003 | Shimshi ....................... | 60/495 |
| 2001/0049938 A1 | 12/2001 | Urasawa et al. | |

FOREIGN PATENT DOCUMENTS

| | | |
|---|---|---|
| GB | 1.361.979 | 7/1974 |
| GB | 1.487.151 | 9/1977 |

* cited by examiner

*Primary Examiner*—Hoang Nguyen
(74) *Attorney, Agent, or Firm*—Michael I Kroll

(57) ABSTRACT

A free walking beam that uses the principles of the Stirling cycle to drive a piston reciprocatatively through a housing cylinder to pivot alternately around a pair of parallel power output shafts to provide a high torque means of generating mechanical energy. The heat differential required for the Stirling cycle is provided by an external heat source such as ambient heat, solar-heated fluid, or recovered waste heat that is applied to the lower end of the housing cylinder when in a substantially vertical position that elevates the piston to the opposing end thereof to create an imbalanced state thereby initiating the rotational freefall of the superior end of the housing cylinder which drives the power output shaft on which it is pivoting. The process is then repeated with the other power output shaft.

26 Claims, 8 Drawing Sheets

START OF FIRST
POWER STROKE

START OF FIRST POWER STROKE

START OF SECOND
POWER STROKE

THERMODYNAMIC FREE WALKING BEAM ENGINE

RELATED APPLICATIONS

This is a continuation-in-part of Ser. No. 10/677,517, filed 2 Oct. 2003 now abandoned.

BACKGROUND OF THE INVENTION

1. Field of the Invention

The present invention relates generally to walking beam engines and, more specifically, a free walking beam engine that generates power through the reciprocating rotary movement of at least one cylindrical housing having an interior piston that is driven therethrough by a controlled temperature differential to effect the rotation of the cylinder to alternately drive a pair of power shafts.

Walking beams have been in use since the early 1900's in oil fields, steam engines, steel fabrication plants, agriculture and other such applications requiring high torque. The walking beam concept previously relied upon the transmission of rotary movement to a linear push/pull motion due to the devices of the prior art being fixed at the power input, power output and pivot points. Conversely, the present invention has no fixed connections and is alternately supported by a pair of pivot clamps that drive their respective power shafts and relies upon the transmission of linear movement (the piston traveling within the cylinder) to rotary motion (the pivot of the revolving cylinder driving the power shaft) to achieve its objectives.

The power input of the present invention is derived from the principles of thermodynamic differential as applied to the "Stirling heat cycle" and the work of inventor Wally Minto. The key principle of a Stirling engine is that a fixed amount of gas is sealed inside a fixed volume of space within the engine. The movement of the piston in the cylinder is manipulated by selectively raising the temperature in a specific portion of the engine with an external heat source to increase the pressure therein thus forcing the piston to move. However, Stirling engines known in the art have two pistons working conjunctively with one another while the present invention has just one piston required for the operation thereof.

Wally Minto's wonder wheel utilized a combination of thermodynamic differential and gravity to generate power by using natural resources. The original wonder wheel comprised four used propane tanks connected to the ends of two lengths of aluminum angle crossed and secured centrally to one another at a pivotal axis in a pinwheel fashion. The opposing tanks are connected to one another with tubing to form a sealed connection and one tank of each connected pair is filled with a low-boiling liquid such as freon or propane. A reservoir containing solar heated water is disposed underneath the wheel in such a manner that the lowermost tank is totally submerged therein during that part of the wheels rotation. The water heats the liquid which then vaporizes and is forced through the tubing into the empty tank on top which then increases in weight as the weight in the lower tank decreases, thereby creating an imbalance with gravity forcing the heavier tank downwards. This cycle continues as long as the heat source remains at a sufficient temperature to vaporize the liquid within the tanks.

The present invention incorporates aspects of a walking beam, the Stirling engine and Wally Minto's wonder wheel to introduce an energy efficient means of generating mechanical energy for direct use or for conversion to electrical energy by utilizing natural resources such as solar-heated water or recovering waste heat as a power input.

2. Description of the Prior Art

There are other engine devices designed for operating off of power derived from natural resources or recovered waste heat. Typical of these is U.S. Pat. No. 3,400,281 issued to M. J. Malik on Sep. 3, 1968.

Another patent was issued to E. Parr as U.S. Pat. No. 3,338,798 on Aug. 29, 1967 and another patent was issued to H. J. Conrad on Aug. 25, 1970 as U.S. Pat. No. 3,525,215. Another patent was issued on Apr. 11, 1972 to C. McCling as U.S. Pat. No. 3,655,301 and another was issued to W. Hsiao as U.S. Pat. No. 3,864,932 on Feb. 11, 1975. Yet another U.S. Pat. No. 3,996,745 was issued to J. D. Davoud et al. on Dec. 14, 1976 and still yet another was issued on Nov. 15, 1977 to J. Mulder as U.S. Pat. No. 4,058,382.

Another patent was issued to J. L. Liljequist on Mar. 3, 1981 as U.S. Pat. No. 4,253,303. Yet another U.S. Pat. No. 4,397,155 was issued to Gordon Davey on Aug. 9, 1983. Another was issued to J. S. Davey on Oct. 11, 1983 as U.S. Pat. No. 4,408,456. Another patent was issued to E. Dibrell, et al. On Apr. 30, 1985 as U.S. Pat. No. 4,513,576 and still yet another was issued on Feb. 17, 1987 to G. M. Benson as U.S. Pat. No. 4,642,988.

G. M. Benson was issued U.S. Pat. No. 4,745,749 on May 24, 1988 and U.S. Pat. No. 6,195,992 was issued to A. G. Nommensen on Mar. 6, 2001. U.S. Patent Application No. US 2001/0049938 A1 was issued to H. Urasawa et al. on Dec. 13, 2001 and Provisional Specification No. 1361979 was issued to E. H. Cooke-Yarborough on 31 Jul. 1974.

U.S. Pat. No. 3,338,798

Inventor: Edward L. Parr

Issued: Aug. 29, 1967

A still for liquor comprising in combination:
(A) two closed-top containers disposed in the liquor, said containers each having an opening in the lower portion thereof;
(B) a heat exchanger disposed in the liquor in one of the containers, said heat exchanger having an inlet and an outlet;
(C) a heat exchanger disposed in the liquor in the other of the containers, the second mentioned heat exchanger having an inlet and an outlet;
(D) a conduit connecting the upper part of one of the containers with the inlet of the heat exchanger in the other container;
(E) means in said conduit for impeding the flow of fluid from said other container to the said one chamber;
(F) a conduit connecting the upper part of said other container with the inlet of the heat exchanger in said one chamber;
(G) means in the second mentioned conduit for impeding the flow of fluid from said one container to said other container;
(H) conduit means connected with the outlets of the heat exchangers, said conduit means providing resistance to the flow of water therethrough;
(I) movable means for intermittently and alternately effecting partial vacuum in the space above the water level in one of the containers and compression in the space above the water level in the other of said chambers.

U.S. Pat. No. 3,400,281

Inventor: Marvin J. Malik

Issued: Sep. 3, 1968

An energy conversion system utilizing the Stirling cycle and an electrokinetic transducer to convert thermal energy to electrical energy. This is achieved by replacing in a conventional Stirling cycle engine the usual power piston 7 with a flexible diaphragm. The flexible diaphragm performs the power piston's functions of alternately compressing and expanding the working medium during the Stirling cycle and additionally the resultant pressure variations are used to drive an electrokinetic transducer. When the electrokinetic transducer is driven in this way an electrokinetic liquid is urged back and forth through a porous member so as to develop an alternating electric potential across the transducer's electrodes. This electric potential is used to drive a load and can also be used to drive a; motor which in turn drives the Stirling cycle engine's displacer piston.

In an alternate construction the power piston is not replaced but is connected to a flexible diaphragm that drives the electrokinetic transducer in the same manner as the flexible diaphragm when used as a replacement for the power piston.

U.S. Pat. No. 3,525,215

Inventor: Hans Joachim Conrad

Issued: Aug. 25, 1970

A machine having two counter running pistons respectively movably connected to first and second linearly movable displacer means, in which the second linearly movable displacer means has a smaller piston area and an oppositely located larger piston area the smaller piston area of which is hydraulically connected to said first displacer means while passage means establish communication between the larger piston area of said second linearly movable displacer means and a rotary displacer means.

U.S. Pat. No. 3,655,301

Inventor: Clifford F. McClung

Issued: Apr. 11, 1972

A fluid pump having a piston member reciprocally disposed within a hollow cylinder utilizes the oscillating action of an external walking beam as a prime mover thereof. Turnbuckle means secure the cylinder of the compressor to a stationary surface and further provide a means for adjusting the compression ratio. The piston member possesses the ability to compensate for piston ring wear thereby maintaining the piston ring in sealing engagement with the inner wall of the cylinder.

U.S. Pat. No. 3,864,932

Inventor: Wan-Om Hsiao

Issued: Feb. 11, 1975

Apparatus for treating sea water to separate potable water from the saline solution and recover the potable water. The apparatus includes a treating chamber maintained under subatmospheric pressure and into which sea water under pressure is introduced so that a substantial differential of pressure exists to cause the sea water to vaporize. Apparatus within the chamber separates potable water from saline water and collects the potable water while the saline water is discharged.

U.S. Pat. No. 3,996,745

Inventor: John Gordon Davoud et al.

Issued: Dec. 14, 1976

An improved Stirling cycle type engine is provided wherein the working fluid is a condensable fluid such as steam and a portion of the steam is condensed prior to the introduction of the steam into the cold cylinder zone. Before and/or during compression of the steam in the cold cylinder zone, water is injected in an amount equal to, greater than or less than the amount condensed.

U.S. Pat. No. 4,058,382

Inventor: Jan Mulder

Issued: Nov. 15, 1977

A hot-gas reciprocating machine having a free piston, one face of which varies the volume of a working space while its other face bounds a buffer space of constant pressure. A control mechanism maintains a constant nominal central piston position by momentarily connecting the working space and the buffer space.

U.S. Pat. No. 4,253,303

Inventor: Jon L. Liljequist

Issued: Mar. 3, 1981

An engine other than an internal combustion engine, and preferably one incorporating the underlying philosophy of the Stirling hot gas engine, is physically arranged to both significantly reduce its size and weight relative to earlier designs as well as reduce fluid leakage into or out of the engine's gas enclosure. Size and weight reduction are achieved in several ways including that of moving this disclosure's counterpart to the Stirling crankshaft from outside the working-gas enclosure to inside the working-gas enclosure, or at least closer thereto than in existing designs. In several embodiments of the invention, this rearrangement simultaneously eliminates a major source of fluid leakage. In some designs of this disclosure, the Stirling working-gas enclosure, which consists of a power piston and cylinder, are replaced by a somewhat different appearing and thoroughly sealed working-gas enclosure that includes a bellows, this also assisting in reducing weight. The Stirling displacer piston has also been modified both to improve efficiency and thus reduce weight. In one configuration it houses this invention's counterpart to the conventional Stirling crankshaft, in another embodiment it is driven by and assisted in its principal function by a rotating cam element, and in all embodiments it can be modified to direct the entrapped gas along different paths or routes depending on whether it is moving toward the hot end of the gas enclosure or toward the other end.

U.S. Pat. No. 4,397,155

Inventor: Gordon Davey

Issued: Aug. 9, 1983

A Stirling cycle machine in which the compressor/expander is in driving connection with a first electromagnetic unit, and in which a second electromagnetic unit is connected to the displacer and can be operated as an externally-variable control of the movements of the displacer. In one form of the invention the second unit acts as an electromagnetic damper upon movements which the displacer makes in natural response to those of the compressor. In another form of the invention the second unit positively drives the displacer and the two units are interconnected by means including a phase-shifting device whereby movements of compressor and displacer are kept of equal frequency but variable as to phase difference. Transducers sensitive to position, velocity or acceleration may improve control of the movements of compressor and displacer, and a temperature sensor associated with the "cold finger" of the displacer may further improve control of the movements of the latter.

U.S. Pat. No. 4,408,456

Inventor: Jeffrey S. Rauch

Issued: Oct. 11, 1983

A power control is disclosed for a free piston Stirling engine having a hermetically sealed vessel enclosing a working space in which oscillates a displacer for circulating working gas through a heater, a regenerator and a cooler for creating a pressure wave in the working gas which acts against a power piston for a producing power stroke. The displacer includes a post mounted in a well which forms a gas spring and cooperates with the working gas pressure wave to maintain the displacer in axial reciprocating motion. The post includes a tapered portion which reciprocates opposite a proximity probe to produce a unique signal for each axial position of the displacer to provide stroke, phase and amplitude information regarding the displacer motion. A gas spring volume control is provided, controlled by the displacer sensor, for adjusting the gas spring stiffness to control the amplitude and phase of the displacer required to produce the power to meet the engine load requirements.

U.S. Pat. No. 4,513,576

Inventor: Edwin W. Dibrell, et al.

Issued: Apr. 30, 1985

The disclosure provides an oscillatable body mounting a cylinder defining an elongated fluid pressure chamber having at least one end thereof remotely located with respect to the axis of oscillation. The elongated fluid pressure chamber accommodates a free piston which reciprocates along the length of the chamber according to fluid pressure applied thereto. Solenoid operated inlet and exhaust valves are provided at each end of the elongated fluid pressure chamber, and sensing devices, responsive to the passage of the free piston therethrough are disposed on opposite ends of the elongated fluid pressure chamber and adjacent the medial portions thereof to control the operation of the inlet and exhaust valves in accordance with the desired objective to either maximize the extraction of mechanical energy from a pressured gas in the form of oscillating movements of the body, or maximize the expansion of the pressured gas to derive the greatest possible cooling effect therefrom.

U.S. Pat. No. 4,642,988

Inventor: Glendon M. Benson

Issued: Feb. 17, 1987

A Stirling engine design which is solar powered is disclosed. A solar receiver converts solar radiation to thermal energy, which is stored in a storage chamber. The engine includes a displacer chamber with a displacer piston which divides the chamber into hot and cold subchambers, the hot subchamber being heated by the storage chamber. A mechanism is provided for cooling the cold subchamber. The engine also includes an alternator chamber with an alternator piston which divides the chamber into working and bounce subchambers, the working subchamber being in fluid communication with the cold subchamber of the displacer. The working fluid circulates through the cold subchamber and the working subchamber and obtains heat from the storage chamber. The working fluid is displaced by the displacer piston to drive the alternator piston, and work output is obtained from the alternator piston.

U.S. Pat. No. 4,745,749

Inventor: Glendon M. Benson

Issued: May 24, 1988

A Stirling engine design which is solar powered is disclosed. A solar receiver converts solar radiation to thermal energy, which is stored in a storage chamber. The engine includes a displacer chamber with a displacer piston which divides the chamber into hot and cold subchambers, the hot subchamber being heated by the storage chamber. A mechanism is provided for cooling the cold subchamber. The engine also includes an alternator chamber with an alternator piston which divides the chamber into working and bounce subchambers, the working subchamber being in fluid communication with the cold subchamber of the displacer. The working fluid circulates through the cold subchamber and the working subchamber and obtains heat from the storage chamber. The working fluid is displaced by the displacer piston to drive the alternator piston, and work output is obtained from the alternator piston.

U.S. Pat. No. 6,195,992

Inventor: Arthur Charles Nommensen

Issued: Mar. 6, 2001

A Stirling cycle engine having two chambers (formed by 12-14, or 12, 15 and 16) containing a working fluid and rotatable rotor disks (10, 11) coupled to a common output power shaft (3). Each chamber has a hot zone and a cold zone, and a passage (23) leads from the hot zone in one chamber to the cold zone in the other chamber and a passage (24) leads from the hot zone in the other chamber to the cold zone in the one chamber. Each rotor disk (10, 11) has a displacer section (5) for displacing the working fluid and a turbine section (6) having turbine blades (7) arranged along its periphery. The disks (10, 11) rotate out of phase with each other and working fluid from the respective passages (23, 24) is directed to the blades (7) to rotate the disks (10, 11) when engine is in operation.

U.S. Patent Number 2001/0049938

Inventor: Hideto Urasawa et al.

Issued: Apr. 5, 1988

A stirling cycle engine whose cylinder, including a mount, can be easily fabricated and securely attached. The stirling cycle engine of the invention comprises a casing having a cylindrical portion 2; a metallic cylinder 7 coaxially inserted into the cylindrical portion 2 of the casing 1; a piston 15 inserted into the cylinder 7; a drive mechanism 16 for reciprocally driving the piston 15; and a mount 28 which is attached to an outer periphery of the cylinder 7 for fixing the cylinder 7 to the casing 1 and retaining the drive mechanism 16. The mount 28 is made of a material of low heat conductance, constructed separately from the cylinder 7. The mount 28 is attached to the outer periphery of the cylinder 7. Thus, the easier working thereof is resulted, so that the working time is shortened, to thereby improve productivity, and reduce working costs. Further, The heat from the drive mechanism 16 is less likely to transfer to the cylinder 7 via the mount 28.

U.S. Pat. No. 1,361,979

Inventor: Edmund Harry Cooke-Yarborough et al.

Issued: Jul. 31, 1974

A Stirling cycle heat engine comprising hot and cold variable volume chambers inter-communicating through a regenerator disposed centrally between the chambers and attached to the chambers by way of a pair of movable inner walls each of which forms an inner end part of one of the walls.

SUMMARY OF THE PRESENT INVENTION

A primary object of the present invention is to provide a walking beam engine that generates mechanical power by having a pivoting cylinder alternately drive a pair of parallel power output drive shafts.

Another object of the present invention is to provide a walking beam engine that derives its power from a piston that travels from the bottom of the cylinder to the top through a thermodynamic differential applied to a working fluid contained therein.

Yet another object of the present invention is to provide a walking beam engine that receives its power input from natural means such as ambient heat, solar-heated water or recovered waste heat.

An additional object of the present invention is to provide a walking beam engine having a recovery stroke that ends and a power stroke begins less than 90° from horizontal, typically 15° from vertical.

Still yet another object of the present invention is to provide a walking beam engine that is simple and easy to use.

Another object of the present invention is to provide an infusion and encapsulation platform attachment for a walking beam engine that is inexpensive to manufacture and operate.

Another object of the present invention is to provide an infusion and encapsulation platform attachment for a walking beam engine that allows easy removal of power cylinders for maintenance and upgrading or for installation of additional power cylinders to expand engine capacity.

Additional objects of the present invention will appear as the description proceeds.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
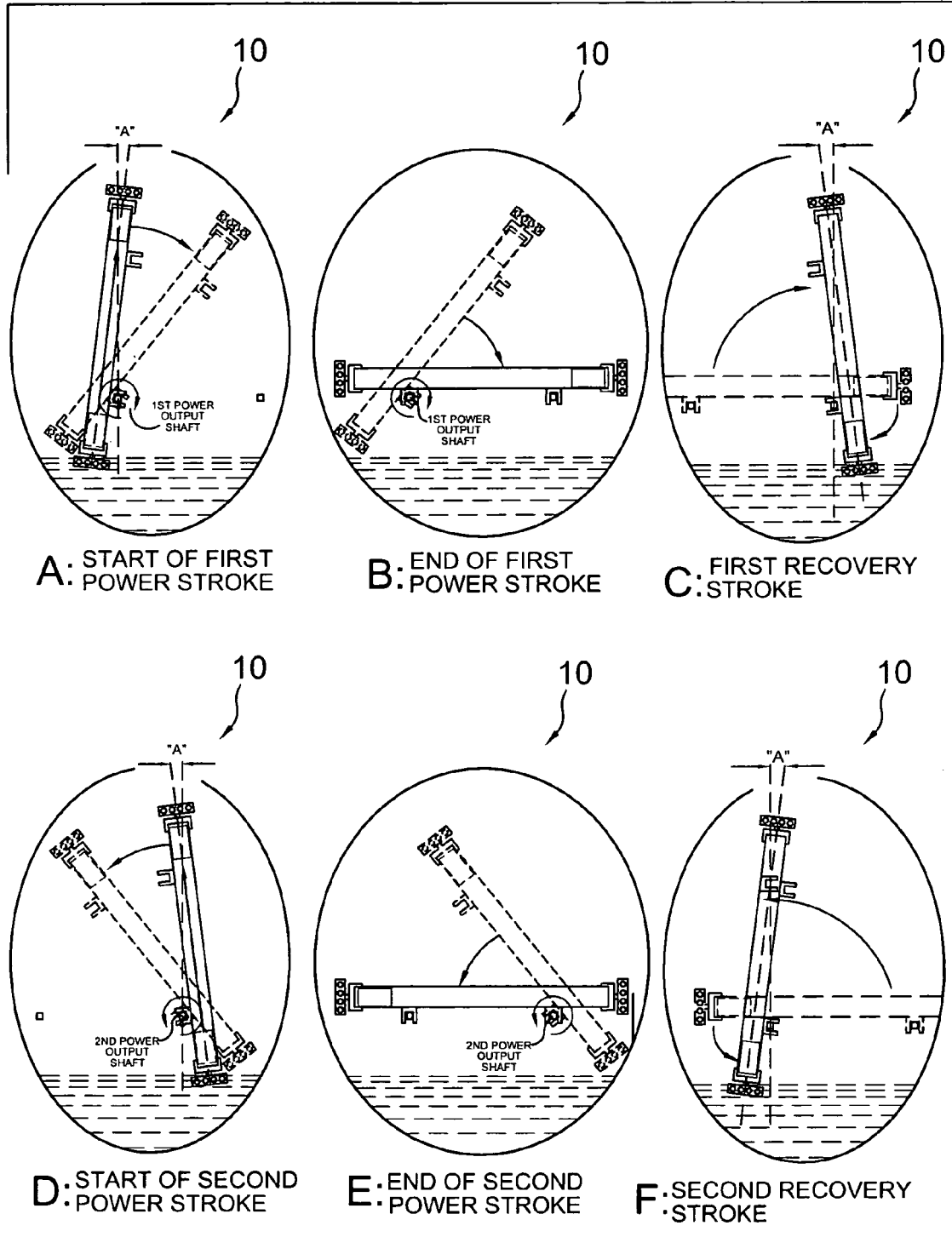
FIG. 1 is a sequential view demonstrating the two-power stroke or four-stroke cycle of the present invention.

Turning now descriptively to the drawings, in which similar reference characters denote similar elements throughout the several views, the figures illustrate the Thermodynamic Walking Beam Engine of the present invention. With regard to the reference numerals used, the following numbering is used throughout the various drawing figures.

10 Thermodynamic Walking Beam Engine
11 angular displacement from vertical
12 housing cylinder
14 interior chamber of 12
16 first end of 12
18 second end of 12
20 first end cap
22 second end cap
24 working fluid 26 piston
28 first heat exchanger
30 second heat exchanger
31 external heat source
32 first pivot clamp
33 second pivot clamp
34 first power output shaft
36 second power output shaft
38 hydro-carbon fuel
40 butane
42 propane
44 refrigerant
45 R134A refrigerant
46 one-way drive means
48 ratchet mechanism
50 clutch mechanism
52 recovered heat waste
54 solar-heated water
56 pressurized water
58 elevated reservoir
60 nozzle
62 turbine wheel
64 generator
66 donut sleeve seal
67 piston rings
68 cylinder housing attachment of 66
69 non-compressible fluid
70 piston attachment of 66

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is a diagrammatic view of the two-power stroke or four-stroke cycle of the present invention 10. The present invention 10 has a four-stroke cycle including two power strokes and two recovery strokes to generate mechanical energy for direct usage or may be converted to electrical energy.

Figure 2:
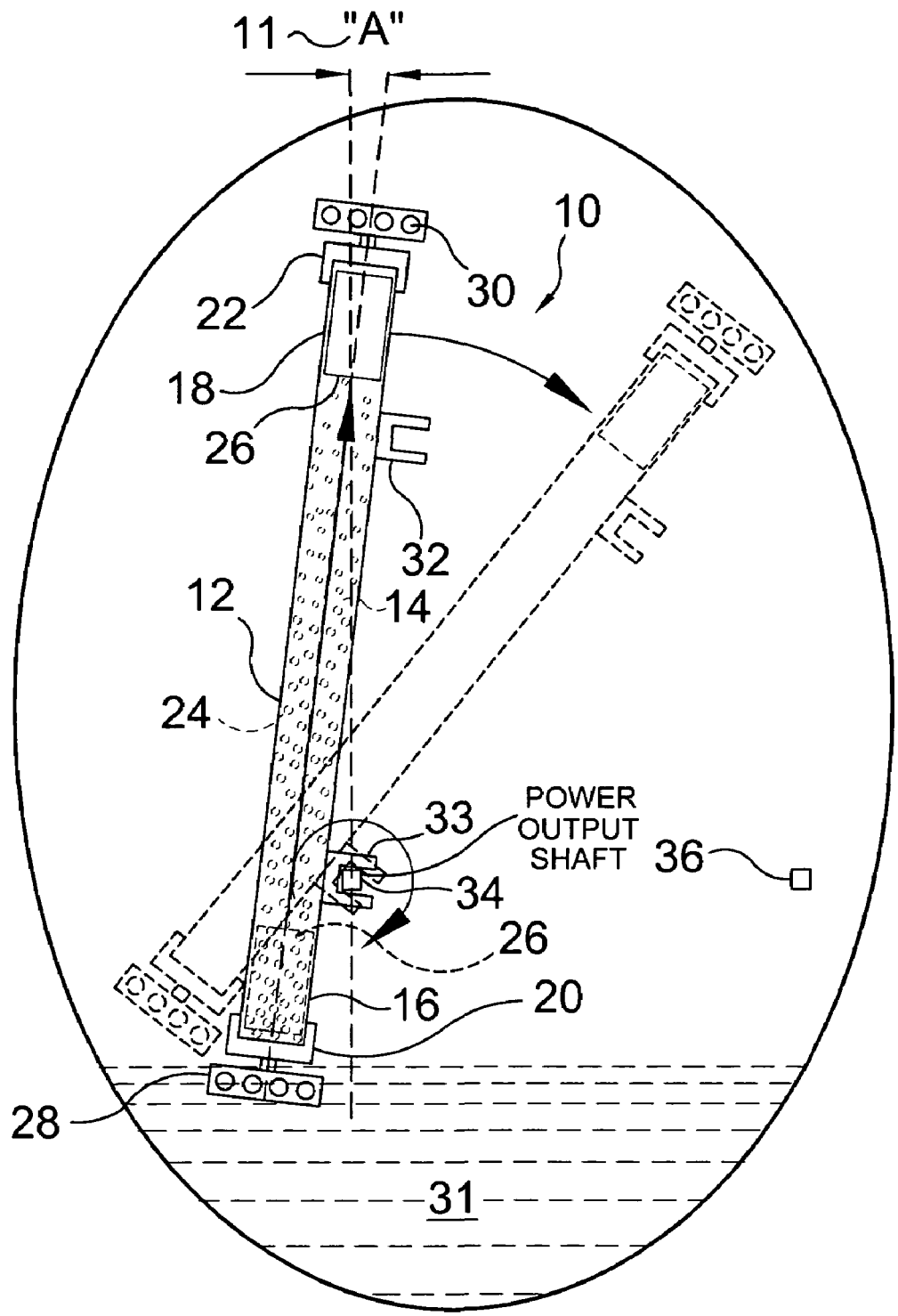
FIG. 2 is a diagrammatic view of the start of the first power stroke of the present invention.

FIG. 2 is a diagrammatic view of the start of the first power stroke. As illustrated, the housing cylinder 12 has a starting point with an angular displacement 11 from the vertical sufficient to initiate rotational freefall. The housing cylinder 12 has end caps 20,22 on its two ends 16,18 thereby forming a sealed interior chamber 14 for retaining a working fluid 24 such as butane, propane or a refrigerant that acts upon the piston 26 when a temperature differential is present between the first end 16 and the second end 18. Heat exchangers 28,30 are attached to the end caps 20,22 for transmitting heat from an external heat source 31 when in contact therewith thus creating a temperature differential that increases the heat of the working fluid 24 that is proximal therewith and elevates the piston 26 to the top of the housing cylinder 12. The weight of the piston 26 creates an unbalanced condition and the piston 26 and housing cylinder 12 begin a rotational freefall from the vertical to the horizontal position along the axis of first power output shaft 34 which is rotationally engaged with the first pivot clamp 32 of the housing cylinder 12.

Figure 3:
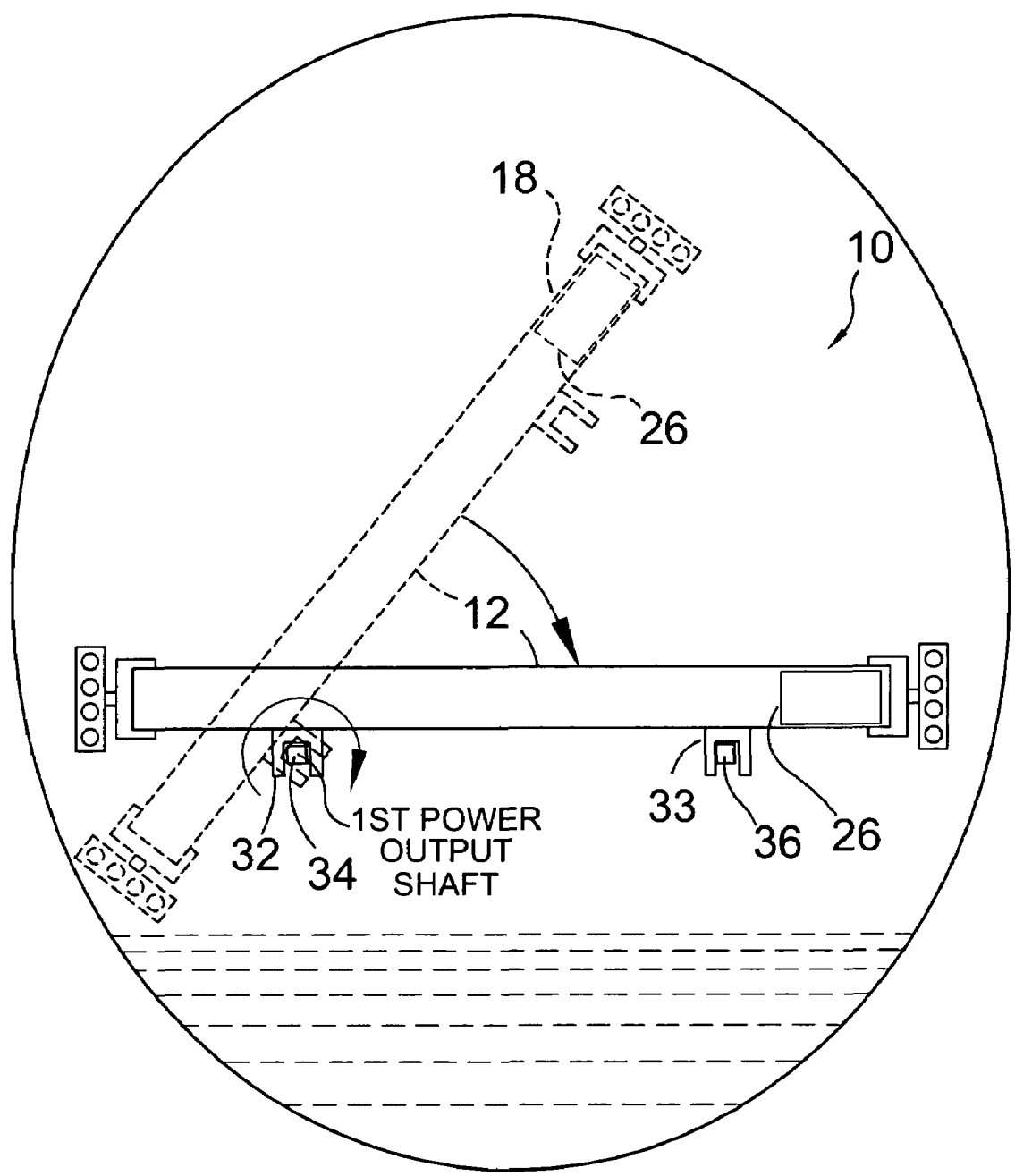
FIG. 3 is a diagrammatic view of the end of the first power stroke of the present invention.

FIG. 3 is a diagrammatic view of the end of the first power stroke of the present invention 10 demonstrating the rotational freefall of the housing cylinder 14 during the first power stroke wherein the second end 18 descends until the fall is stopped when the second pivot clamp 33 engages the second power output shaft 36. The rotation of the housing cylinder 12 during the power stroke generates mechanical energy that is transferred as the first pivot clamp 32 drives the first power output shaft 34.

Figure 4:
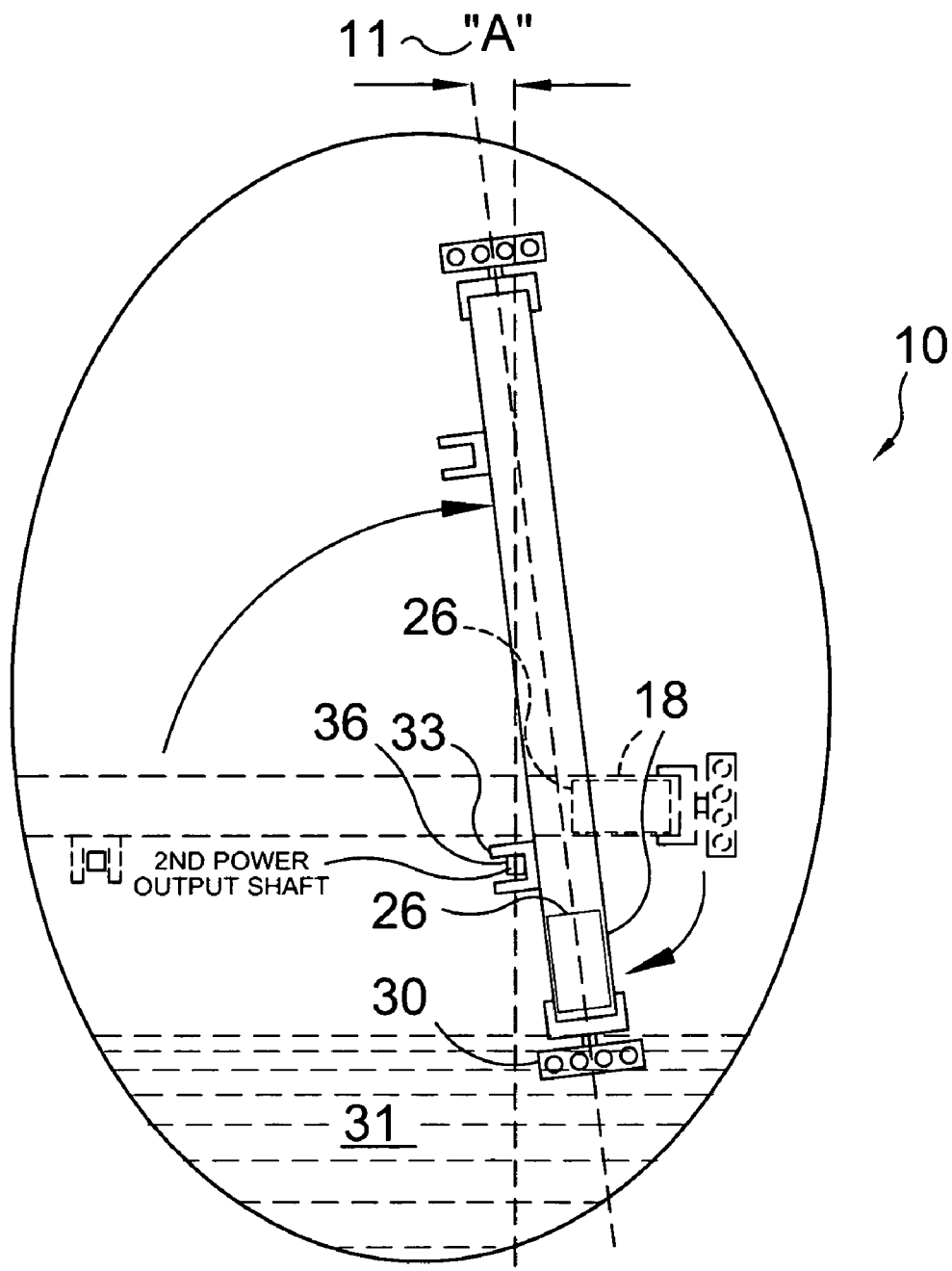
FIG. 4 is a diagrammatic view of the first recovery stroke of the present invention.

FIG. 4 is a diagrammatic view of the first recovery stroke of the present invention 10. The weight of the piston 26 drops the second end 18 of the housing cylinder 12 into the external heat source 31 as the housing cylinder 14 freewheels around the second power output shaft 36 by means of the second pivot clamp 33.

Figure 5:
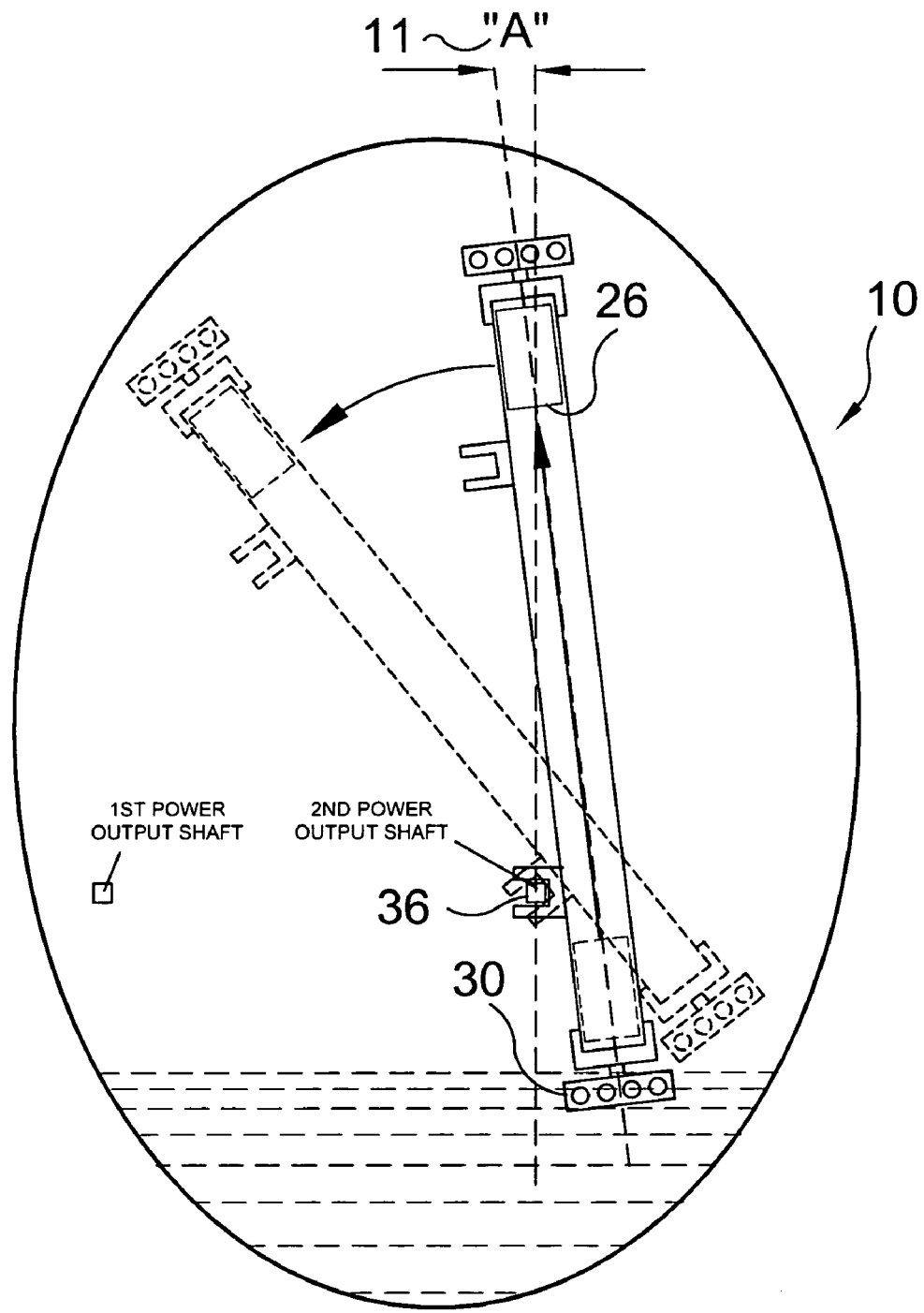
FIG. 5 is a diagrammatic view of the start of the second power stroke of the present invention.

FIG. 5 is a diagrammatic view of the start of the second power stroke. As illustrated, the housing cylinder 12 has a starting point with an angular displacement 11 from the vertical sufficient to initiate rotational freefall. The housing cylinder 12 has end caps 20,22 on its two ends 16,18 thereby forming a sealed interior chamber 14 for retaining a working fluid 24 such as butane, propane or a refrigerant that acts upon the piston 26 when a temperature differential is present between the second end 18 and the first end 16. Heat exchangers 28,30 are attached to the end caps 20,22 for transmitting heat from an external heat source 31 when in contact therewith thus creating a temperature differential that increases the heat of the working fluid 24 that is proximal therewith and elevates the piston 26 to the top of the housing cylinder 12. The weight of the piston 26 creates an unbalanced condition and the piston 26 and housing cylinder 12 begin a rotational freefall from the vertical to the horizontal position along the axis of second power output shaft 36 which is rotationally engaged with the second pivot clamp 33 of the housing cylinder 12.

Figure 6:
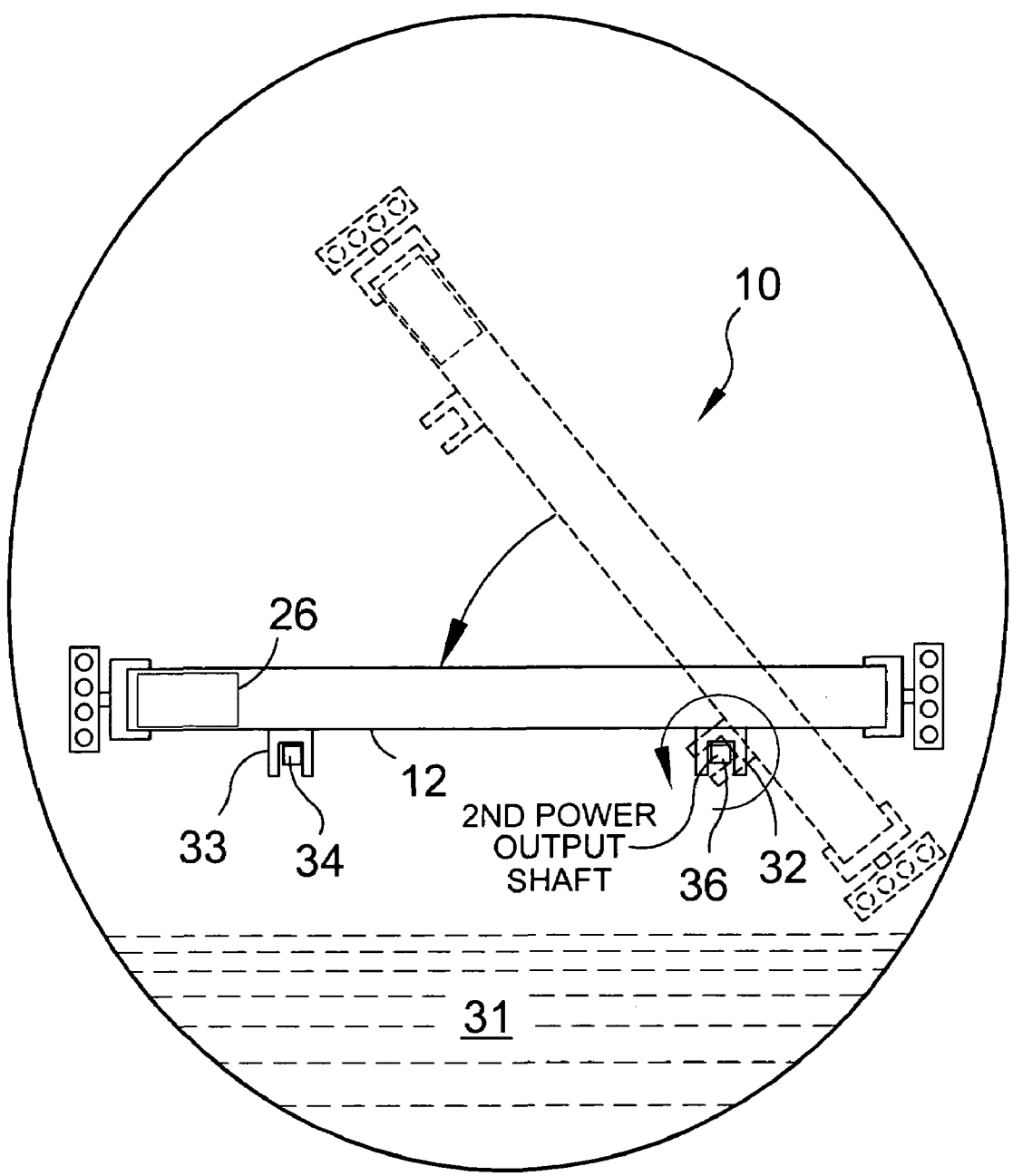
FIG. 6 is a diagrammatic view of the end of the second power stroke of the present invention of the present invention.

FIG. 6 is a diagrammatic view of the end of the second power stroke of the present invention 10 demonstrating the rotational freefall of the housing cylinder 14 during the second power stroke wherein the first end 16 descends until the fall is stopped when the first pivot clamp 32 engages the first output shaft 34. The rotation of the housing cylinder 12 during the power stroke generates mechanical energy that is transferred as the second pivot clamp 32 drives the second power output shaft 36.

Figure 7:
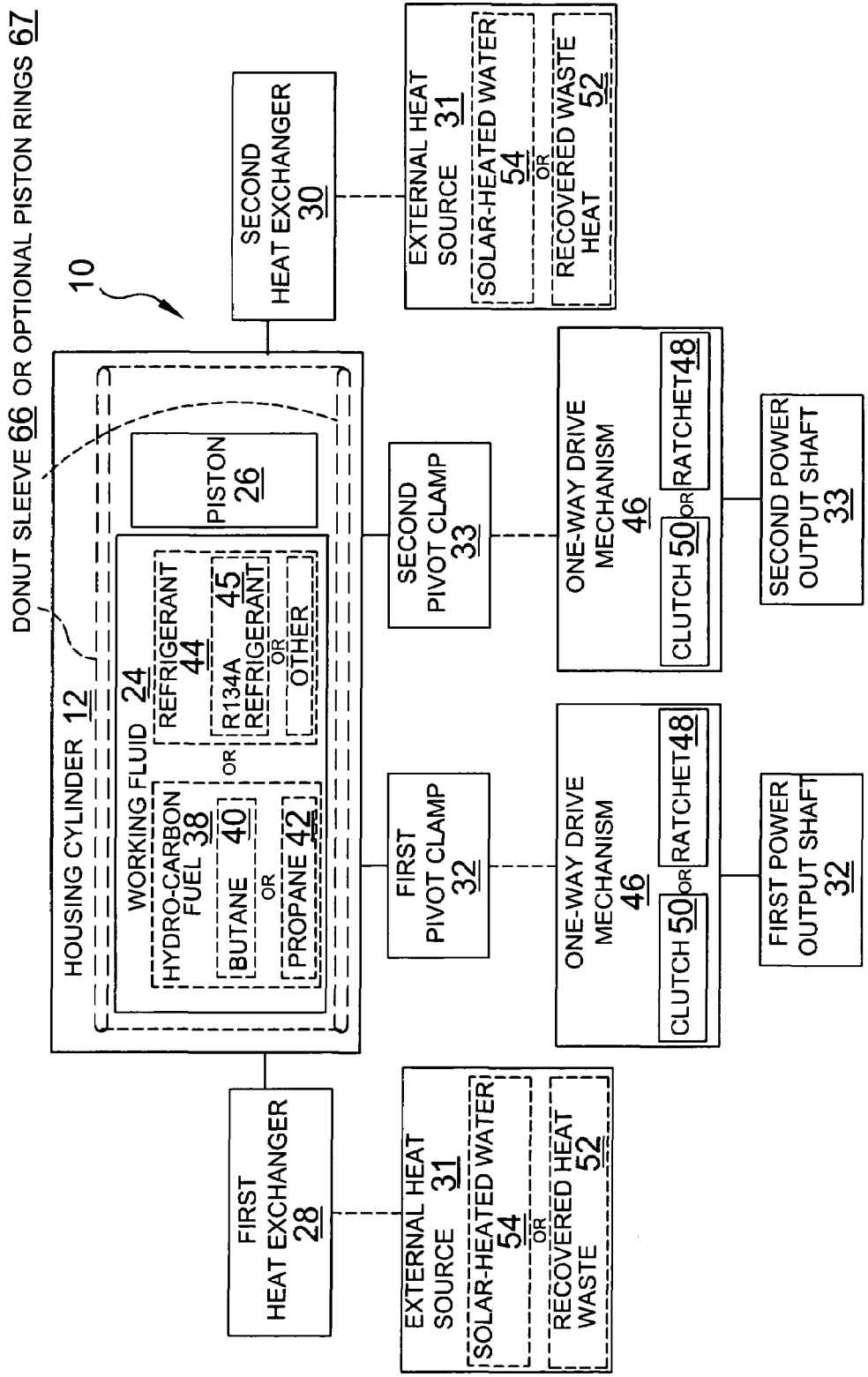
FIG. 7 is a block diagram demonstrating the options and relationships of the primary components of the present invention.

FIG. 7 is a block diagram of the relationships and some of the options of the primary components of the present invention 10.

Figure 8:
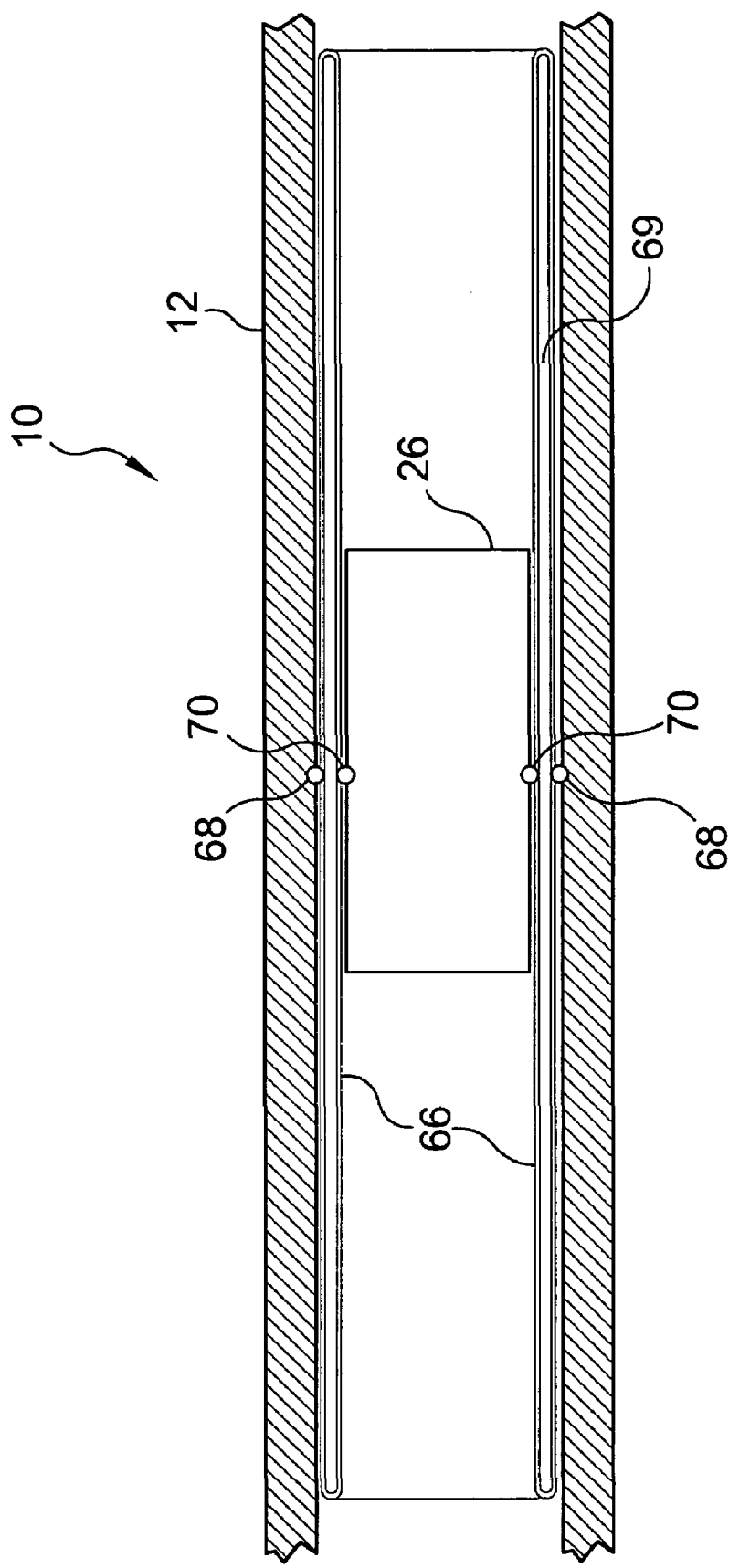
FIG. 8 is a sectional view demonstrating the donut sleeve seal of the present invention.

FIG. 8 is a sectional view demonstrating the donut sleeve seal 66 of the present invention 10. The donut sleeve seal 66 provides a low friction complete seal between the alternating high pressure and lower pressure ends of the housing cylinder 12. The donut sleeve seal 66 material is capable of withstanding refrigerant 44 or hydrocarbon fuel 38 gases and is preferably fabricated, but not limited to, a flexible rubber or plastic film or sheet in the form of a cylinder, then turned back on itself thereby forming a long "donut" extending half the length of the housing cylinder 12. The inner sleeve portion has a 360 degree circumferential medial attachment with the piston 26 and has a fully sealed attachment with the cylinder housing inner wall at a central location. A non-compressible fluid 69 is contained within the donut sleeve seal 66. Alternately piston rings 67 can be used instead of the donut sleeve seal.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A thermodynamic free walking beam engine comprising:
   a) a housing cylinder having a hollow interior and a first end and a second end
   b) A first end cap secured to said first end of said housing cylinder and a second end cap secured to said second end to seal said interior chamber;
   c) a pressurized low-boiling working fluid contained within said housing chamber;
   d) a mass in the form of a piston that is driven from one end of said housing cylinder to the other;
   e) a first heat exchanger and a second heat exchanger disposed proximal to and in direct communication with their respective end caps;
   f) an external heat source disposed inferior to the lower end of said housing cylinder when in the vertical position and close enough to apply heat to said heat exchanger to increase the temperature of the proximal working fluid;
   g) a first substantially horizontal, parallel output power shaft and a second substantially horizontal, parallel output power shaft; and
   h) a first open pivot clamp and a second open pivot clamp fixedly disposed on the exterior of said housing cylinder and substantially offset from their respective ends thereof and arranged for engagement with their respective power shafts when said housing cylinder is in the fully horizontal position; and
   i) a starting point wherein said housing cylinder is angularly displaced from the vertical sufficiently to initiate rotational freefall.

2. A thermodynamic free walking beam engine as recited in claim 1, wherein said housing cylinder and said end caps are fabricated of a sturdy, lightweight material.

3. A thermodynamic free walking beam engine as recited in claim 2, wherein said sturdy, lightweight material is carbon fiber reinforced thin wall stainless steel.

4. A thermodynamic free walking beam engine as recited in claim 1, wherein said piston is fabricated of a material having significant mass.

5. A thermodynamic free walking beam engine as recited in claim 4, wherein said piston material includes a steel/lead composite.

6. A thermodynamic free walking beam engine as recited in claim 1, wherein said working fluid is a hydrocarbon fuel.

7. A thermodynamic free walking beam engine as recited in claim 6, wherein said hydrocarbon fuel is butane.

8. A thermodynamic free walking beam engine as recited in claim 6, wherein said hydrocarbon fuel is propane.

9. A thermodynamic free walking beam engine as recited in claim 1, wherein said working fluid is an environmentally friendly refrigerant.

10. A thermodynamic free walking beam engine as recited in claim 9, wherein said working fluid is R134A refrigerant.

11. A thermodynamic free walking beam engine as recited in claim 1, wherein said output drive shafts include a one-way drive means at the pivot point to provide drive during the power stroke and a rapid low friction counter-rotation during the recovery stroke when engaged with the respective pivot clamp.

12. A thermodynamic free walking beam engine as recited in claim 1, wherein said one-way drive means is a ratchet-type mechanism.

13. A thermodynamic free walking beam engine as recited in claim 1, wherein said one-way drive means is a clutch-type mechanism.

14. A thermodynamic free walking beam engine as recited in claim 1, wherein said heat exchangers attached to said end caps includes coiled thin-walled copper tubing.

15. A thermodynamic free walking beam engine as recited in claim 1, wherein said external heat source is recovered waste heat.

16. A thermodynamic free walking beam engine as recited in claim 1, wherein said external heat source includes solar-heated water.

17. A thermodynamic free walking beam engine as recited in claim 1, wherein the operating cycle of each cylinder housing of the present invention having a four stroke cycle comprising a first power stroke, a first recovery stroke, a second power stroke and a second recovery stroke with power output only generated during the power stroke.

18. A thermodynamic free walking beam engine as recited in claim 17, wherein the recovery stroke ends and a power stroke begins less than 90° from horizontal, typically 15° from vertical.

19. A thermodynamic free walking beam engine as recited in claim 1, wherein operation of the present invention is initiated when said housing cylinder is weighted down in the vertical position by said piston residing in said first end thereof as said external heat source applies heat to said heat exchanger which is transferring heat to said working fluid in said first end thereby creating a temperature differential between said working fluid in said first end and that in said second end and increasing the gas pressure behind said piston sufficiently to drive it upward to said second end thus developing an imbalanced condition with the weighted elevated piston beginning its rotational descent whereby the orbital descent of the housing cylinder and its engaged first pivot clamp serve to drive said one-way drive means of said first output power shaft to generate mechanical power for direct usage or for conversion to electrical energy during the first power stroke which occurs during the freefall of said housing cylinder into the horizontal position.

20. A thermodynamic free walking beam engine as recited in claim 19, wherein the first recovery stroke occurs when said housing cylinder is in the horizontal position and said first and second pivot clamps are engaged with said first and second one-way drive mechanisms and their respective power shafts thereby allowing the weight of said piston distally positioned in said second end of said housing cylinder and extending beyond said second pivot clamp to force said second end to rotate downward and around said second power shaft and effectively reposition said housing cylinder into a substantially vertical position.

21. A thermodynamic free walking beam engine as recited in claim 20, wherein the second power stroke begins upon completion of said first recovery stroke wherein said second end of said substantially vertically positioned housing cylinder is exposed to said external heat source which applies heat to said heat exchanger which is transferring heat to said working fluid in said second end thereby creating a temperature differential between said working fluid in said second end and that in said first end and increasing the gas pressure behind said piston sufficiently to drive it upward to said first end thus developing an imbalanced condition with the weighted elevated piston beginning its rotational descent whereby the orbital descent of the housing cylinder and its engaged second pivot clamp serve to drive said one-way drive means of said second output power shaft to generate mechanical power.

22. A thermodynamic free walking beam engine as recited in claim 21, wherein the second recovery stroke occurs when said housing cylinder is in the horizontal position and said first and second pivot clamps are engaged with said first and second one-way drive mechanisms and their respective power shafts thereby allowing the weight of said piston distally positioned in said first end of said housing cylinder and extending beyond said first pivot clamp to force said first end to rotate downward and around said first power shaft and effectively reposition said housing cylinder into a substantially vertical position.

23. A thermodynamic free walking beam engine as recited in claim 1, wherein a plurality of housing cylinders are set in sequence on the same drive shafts to provide a cleaner and smoother level of power output.

24. A thermodynamic free walking beam engine as recited in claim 1, wherein a plurality of housing cylinders are set in sequence on the same drive shafts to provide power for direct usage.

25. A thermodynamic free walking beam engine as recited in claim 1, wherein the high torque output of the present invention is used to mechanically pressurize a fluid for storage in an elevated reservoir to store potential energy that can be highly regulated when released to achieve the necessary RPM's required to drive a pump or electric generator.

26. A thermodynamic free walking beam engine as recited in claim 1, wherein the high torque output of the present invention is used to mechanically pressurize a fluid through a nozzle to impinge on a turbine wheel driving a generator.

* * * * *